3,294,756
CONTINUOUS POLYMERIZATION OF E-CAPROLACTAM
William N. Russell, Petersburg, Albert H. Wiesner, Chester, and Orvill E. Snider, Petersburg, Va., assignors to Allied Chemical Corporation, New York, N.Y., a corporation of New York
Filed May 1, 1963, Ser. No. 277,277
6 Claims. (Cl. 260—78)

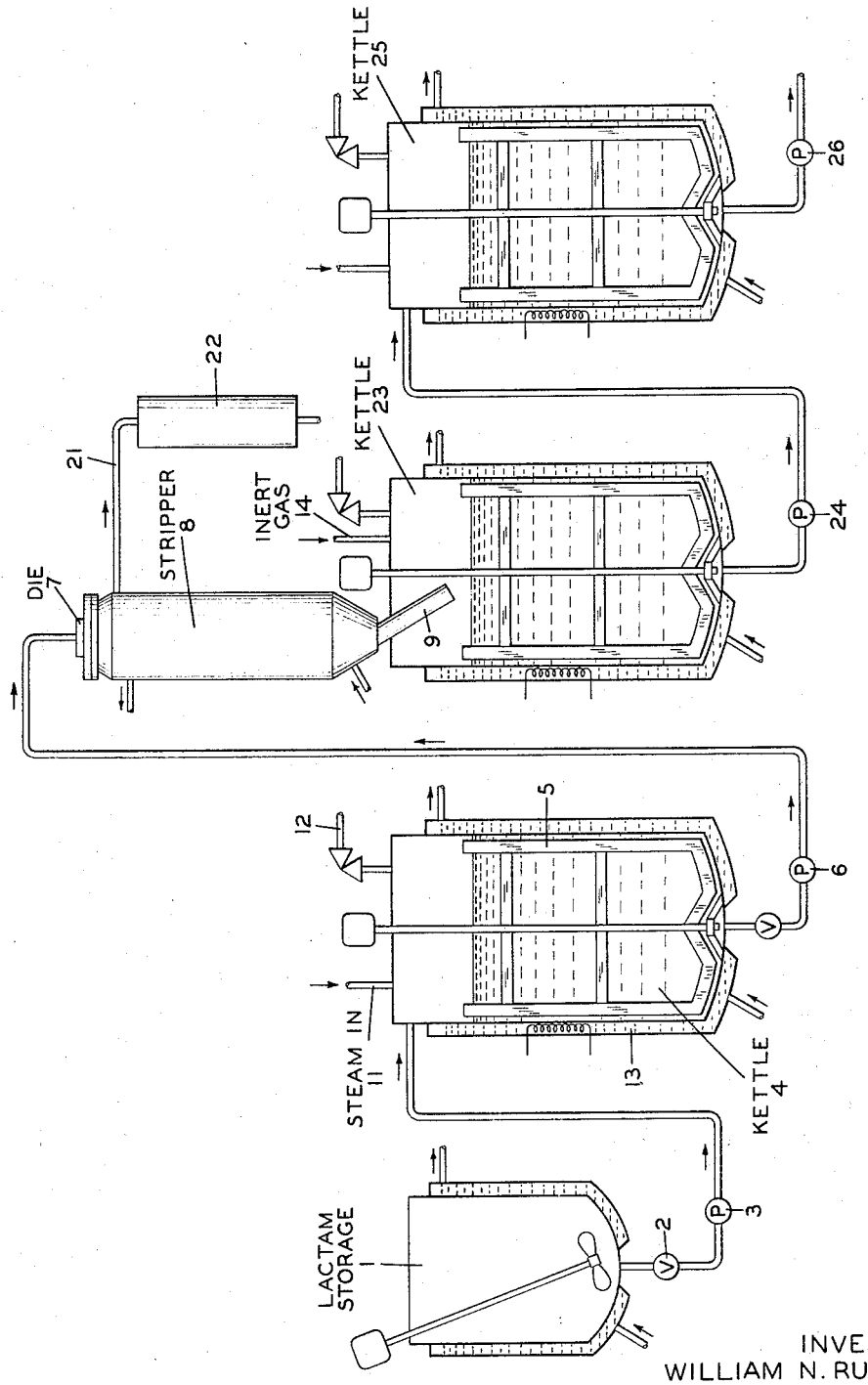

This invention relates to process for continuous polymerization of e-caprolactam. More specifically, this invention relates to process producing poly-e-caproamide from e-caprolactam continuously at favorable rates and with high quality and high uniformity in the resulting polymer. The present process allows producing continuously e-polycaproamide of any desired degree of polymerization corresponding to Formic Acid Relative Viscosities between about 20 and about 80. The term "Formic Acid Relatively Viscosity" means viscosity determined by measuring density and efflux time of a solution of polymer in aqueous 90% formic acid at 25° C. and concentration of 11 grams of polymer per 100 ml. of solvent in accordance with ASTM Method No. D–789–53T. A Formic Acid Relative Viscosity of 55 corresponds to about 18,000 number average molecular weight.

The Formic Acid Relative Viscosities stated herein are those determined upon polymer leached with hot water and dried, i.e. polymer product from which the water extractable content has been largely removed and which has been dried to about 0.1% or lower moisture.

It has been proposed heretofore to form polyamides, in particular condensation polyamides from diamines and dicarboxylic acids, by operations involving partially polymerizing or condensing the reactants and exposing the resulting prepolymer in finely divided form, thin film form, and/or other form with large surface area to an atmosphere capable of evaporating water from the prepolymer thereby effecting polymerization or condensation of the prepolymer to obtain the final polymer of desired viscosity. Such operations have been subject to the disadvantage of requiring relatively large apparatus in order to obtain the required exposure time of polymer in a form having large surface area and, moreover, tend to produce non-uniform polymer product because the extended form of the polymerizing material is apt to result in subjecting the polymer to varying conditions during the polymerization.

It is also known to polymerize e-caprolactam by heating in a kettle or the like at temperatures in the range between about 180° C. and about 300° C. and initially in contact with an atmosphere having water vapor pressure of at least about 25 p.s.i.a., whereby low molecular weight polycaproamide containing water is formed; then releasing the pressure and continuing the polymerization under conditions allowing the evaporation of water from the polyamide as the polymerization progresses. Such processes are generally difficult to control accurately for production of uniform polymer, and/or require relatively long reaction periods.

We have now found that continuous polymerization of e-caprolactam initiated by water under superatmospheric pressures can advantageously be effected by including, as an intermediate step, the improvement which comprises forming a polycaproamide polymerization reaction mixture, containing water, into a form having high exposed surface area of at least about 1 square inch per cubic inch of volume in contact with an atmosphere capable of evaporating water from said reaction mixture, and maintaining the reaction mixture in such high surface area form for a time of at least about 5 seconds thereby removing water therefrom; thereafter in a zone traversed subsequently to the zone containing the high surface area form of the reaction mixture, supplying the polycaproamide to a pool having exposed surface area not above about 1 square inch per 3 cubic inches of volume which pool is maintained in plug flow and with an atmosphere, over said pool, in which control is maintained on the water vapor partial pressures and with residence time in all such pools totalling at least about 1 hour; and desirably with temperature maintained constant throughout said pool within a deviation of at most 10° C.; whereby subsequently to the stage of removing water giving the reaction mixture a high surface area form, the Formic Acid Relative Viscosity of the polymer in the reaction mixture increases by at least 10%.

Our process is a practical embodiment of our discovery that relatively complete and rapid removal of water from polycaproamide allows greatly accelerated subsequent polymerization of the polycaproamide in a form having relatively great depth compared to its surface area, i.e. occupying relatively large volume compared to its surface area; and that such subsequent polymerization of the polyamide from which water has thus been removed can be controlled to attain desired viscosity, by supplying the polyamide to at least one pool through which the polyamide progresses in plug flow under controlled conditions. The temperature is maintained constant throughout said pool within ±10° C., and residence time in all such pools totals at least about 1 hour. Control is maintained upon the water vapor partial pressure in the atmosphere over said pool, which atmosphere is preferably a flowing desiccated inert gas.

In our process the body of polycaproamide of relatively high surface area can be formed by passing molten polycaproamide through a die, or other forming member, to produce a ratio of exposed surface:volume of at least about 1 square inch per cubic inch, and preferably higher, e.g. 10–1,000 square inches per cubic inch. The maximum ratio is limited only by practical considerations of forming the polycaproamide as the desired high surface area body. A very suitable form for this high surface area body is as filaments or strands of diameter about 0.1 millimeter-5 millimeters. Other suitable forms include sprays, falling films and like falling bodies; and also particularly suitable are supported films, ribbons, streams, etc., e.g. conical or tubular films or shallow streams, flowing over supporting surfaces, preferably heated surfaces; or combinations of any of the above.

It is advantageous, for purposes of maintaining uniformity of treating conditions, to avoid foaming of the polycaproamide ahead of the forming member, before conversion into high surface area body. Accordingly preferred operations involve maintaining the polyamide, containing water, at pressures at least about 10 p.s.i. higher than the pressure on the polyamide when it is in the form of a high surface area body. Such pressure differential can be maintained by suitable design of the extrusion orifices through which the high surface area body is formed, in accordance with known principles of fluid flow.

The atmosphere contacted by the high surface area body is preferably a relatively dry atmoshpere, having controlled water vapor partial pressure up to about 10 mm. of mercury absolute pressure, e.g. gas desiccated over silica gel; but advantage is obtained from forming the high surface area body even in a substantially saturated atmosphere, as long as the pressure thereof remains well below the vapor pressure due to the volatile portion of the reaction mixture, at reaction temperatures. Pressures of about atmospheric or below can be used.

The attached drawing is a schematic flow chart illustrative of operation of our process and of design and arrangement of apparatus particularly suited for carrying out our process.

In the flow chart, 1 represents an agitated kettle provided with means for heating, in which molten lactam can be held under blanketing gas. 2 is a control valve regulating the rate of feed of lactam from kettle 1 via pump 3 which is controlled to deliver molten lactam at desired rate, excess lactam being recycled to storage. 4 represents a jacketed, agitated kettle, agitated by anchor type stirrer 5 so as to produce laminar stirring and allow plug flow from the inlet for reaction mixture to the outlet therefor in kettle 4. This kettle is fitted with gas inlet 11, gas phase pressure control means 12, and means 13 for heating a fluid in the jacket.

Pump 6 supplies the effluent from kettle 4 through heated piping to the forming die 7 at the top of stripping chamber 8. Forming die 7 suitably is provided with one or more strand-forming orifices through which molten polyamide is formed into high surface area strands. The walls of stripping chamber 8, at least toward the bottom thereof, are heated; so that descending polymer contacting these walls is brought to the temperature of the melt in the kettle below stripping chamber 8; and heat losses from the high surface area body of polyamide are avoided or minimized.

The stripping chamber is provided with outlet 9 at the bottom thereof through which the polyamide strands drop, and/or through which a film of molten polymer runs from the stripping chamber walls, into the polymerizing kettle 23 below the stripping chamber; and through which gas can pass upward from kettle 23 into and through stripper 8. Inert gas enters kettle 23 at inlet 14, at controlled flow rate. Outlet 21 near the top of stripper 8 allows exit gas to pass to condenser 22. The liquids condensed in condenser 22, consisting essentially of lactam monomer and water, can be recycled to kettle 4, with a bleed to prevent water build-up.

Kettle 23 is generally similar in construction to kettle 4; however in operation it is generally kept not far from atmospheric pressure; and the liquid circulated through its jacket may function to remove heat of polymerization rather than supplying heat, thus controlling the temperature of kettle 23.

Pump 24 withdraws the effluent from kettle 23 at a point remote from the inlet thereto, at controlled flow rate; and may supply this effluent to one or more additional kettles 25, similar to kettle 23. The final effluent polymer from kettle 23, or kettle 24 when such is used, is removed at controlled flow by pump 26 and supplied thereby to pelleting, leaching, and/or other finishing operations not shown.

Additional strippers similar to stripper 8 can be used wherever the removal of volatiles from the polymer may be desired.

The best mode contemplated by us for carrying out our invention will now be set forth with reference to the flow chart:

Molten caprolactam is supplied to storage vessel 1 under a blanket of inert gas, e.g. oxygen-free nitrogen, and is maintained therein under agitation at controlled temperature above the lactam melting point, suitably about 75° C. This lactam has moisture content about 0.1–0.5% and is substantially at its isoelectric point (pH 5.7). It is continuously supplied at controlled flow rate to the polymerization initiating zone, in vessel 4. Heating jackets on all pipes and pumps are provided to maintain the temperature of this molten lactam constant as it passes between vessels in the polymerization apparatus.

A water vapor pressure is maintained in the atmosphere over the reaction mixture of vessel 4, suitably about 2–10 atmospheres absolute water vapor pressure, especially about 3–7 atmospheres absolute water vapor pressure, e.g. as steam in contact with the reaction mixture in vessel 4.

The temperature in this first zone is maintained between about 240° C. and about 280° C. and is preferably held closely constant, within ±2° C. and preferably within ±1° C., whereby to facilitate maintenance of uniform conditions throughout the operations and thus facilitate obtaining uniform product.

The water content (usually from about 0.2% to about 2% by weight) and temperature of this reaction mixture in which polymerization has been initiated are important factors influencing the overall rate of polymerization in our process, hence irregularity in these variables will lead to variations in the product unless compensating controls are applied at a later stage. A particular advantage of our process is that control can be had at the final stage of polymerization to compensate for any earlier minor variations. Water vapor pressures over the reaction mixture in the polymerization initiating stage are desirably held constant within about ±1 p.s.i. whereby to maintain water content of the effluent reaction mixture constant. The water content of this reaction mixture will desirably be not over at most 10%, to avoid overburdening the water removal facilities used in our process.

If additives are desired in the final polymer, they can be introduced in this initial polymerization zone of our process, e.g. copper compound and/or organic heat stabilizer. However additives, other than water, are not required in the present process; in particular no chain terminating viscosity stabilizing compound need be added. An advantage is thereby gained in operations involving remelting the product as in molding, scrap recovery, etc.

The reaction mixture in this initial polymerization zone is smoothly stirred in laminar flow to promote temperature uniformity without disturbing the plug flow through the zone, and is discharged at uniform flow rate, usually from the bottom of the reaction vessel. The reaction mixture progresses in essentially plug flow, i.e. with essentially no back mixing, through the reaction vessel.

The residence time for this initiating stage is suitably about 1 to 5 hours. Residence time in this stage is a third factor, together with water content and temperature, which affects the viscosity of the final polymer, so that a constant volume of reaction mixture in this stage and constant rate of discharge therefrom are desirable.

The effluent from the initiating stage is fed via the forming member 7 at the top of the stripping chamber 8, into contact with an evaporative atmosphere and then into a pool of polycaproamide moving in plug flow. Alternatively the initiating stage effluent can be fed directly into a body, e.g. a pool, of polymerization reaction mixture and will be formed into a body of high surface area at a later stage, through a forming member, e.g. one having orifices or the like; and the resulting high surface area body will contact an evaporative atmosphere to remove water and will then pass into a pool of polymerization reaction mixture moving in plug flow. Two or more stages as above outlined can be used if desired, so as to produce two or more stages of contact, between a high surface area body of polycaproamide and an evaporative atmosphere. At least the last stage of forming the high surface area body, and removing water therefrom, will be followed in our process by at least one zone through which the polycaproamide polymerization reaction mixture progresses in plug flow, as a relatively compact mass, in a pool over which an atmosphere of controlled water vapor pressure is maintained. Desiccated gas, moist gas of regulated dew-point, or steam of regulated pressure can be used to provide such atmosphere. A stream of desiccated gas is preferred for reasons pointed out below.

The partially polymerized reaction mixture, containing water, is formed by member 7, which is suitably a die containing one or more orifices, into a large surface area body, e.g. one or more strands each of diameter say about 1–5 mm. These strands fall downward in the stripping chamber 8 wherein an atmosphere is maintained capable of evaporating water from the polycaproamide. A relatively dry inert gas flowing countercurrent to the strands of polyamide provides a suitable atmosphere. For example, a mixture of nitrogen and carbon dioxide as obtained by burning natural gas, dried e.g. by desiccation over silica gel and freed of oxygen, can be used. This gas can be supplied directly to the stripping chamber or can be introduced elsewhere in the system, e.g. over the pool of reaction mixture below the stripping chamber.

The rate of flow of the inert gas is usually but not necessarily sufficiently high so that the gas leaving the stripping chamber contains not over 50% by volume condensable volatiles from the reaction mixture; but a relatively low flow rate is desirable to economize on cost for gas and to reduce the volume of gas to be processed for recovery of volatiles such as lactam monomer from the exit gas. Suitable flow rates of the inert gas are usually between 0.1 and 200 cc. of gas (STP) per gram of polymerization reaction mixture passing through the stripping chamber per unit time; but can be higher or lower. Higher rates of gas flow promote higher overall rates of polymer formation.

The residence time of the high surface area body of polycaproamide in this stripping chamber must be sufficient to allow removal of substantial quantities of water from the polycaproamide, but can be and for best results should be relatively short whereby only a minor degree of the total polymerization occurs during the stripping operation. Suitable residence times range from about 5 seconds up to say 15 minutes; a time of about 15 seconds to about 5 minutes will generally be used.

The polyamide effluent from this stripping zone will typically contain about 0.1–0.5% by weight of water. Apparently by reason of the relatively short time allowed and slight polymerization observed in our stripping stage, the water removed from the polyamide in the stripper is chiefly dissolved water, rather than chemically combined water.

From the water stripping chamber the polycaproamide, now containing substantially less water than that entering the chamber, falls and/or drips or otherwise passes into a pool of polyamide having the form of a compact mass, through which the polyamide progresses in essentially plug flow with a combined residence time in all such pools following the last stage of water stripping of at least about 1 hour, suitably about 2–10 hours depending upon the degree of polymerization reached at the conclusion of the last stripping stage and that desired in the final product. The polyamide is maintained in such polymerization pool at closely controlled temperature in the range between about 240° C. and about 280° C., maintained within ±2° C., preferably ±1° C., throughout the whole pool by stirring in laminar flow in a plane perpendicular to the line of plug flow.

Inert gas is maintained over the surface of such pool of polymer in at least one polymerization zone subsequent to the initiation stage of polymerization; the water vapor partial pressure in this gas is controlled. Desiccated gas, moist gas of regulated dewpoint, or steam of regulated saturation temperature can be used. Thereby, we find we can control the degree of polymerization of the final polymer as measured by its Formic Acid Relative Viscosity. This controlled water vapor pressure can be and preferably is a low or negligible water vapor pressure as in desiccated gas, e.g. desiccated over silica gel; but in some operations will be relatively high water vapor pressure, e.g. up to say 5 atmospheres absolute. Best control, we have found, is obtained by employing at least 2 hours residence time in this stage and effecting, in this stage, at least about 20% of the total viscosity rise from that for monomer. This can be done by flowing desiccated gas over the polymer pool in this stage; such use of desiccated gas makes the polymer viscosity responsive to flow rate of the gas, which can accordingly be varied to compensate for any changes in viscosity observed in the polymer leaving this stage. Higher desiccated gas flow rates lead to higher viscosities under otherwise the same conditions. The entering inert gas can be preheated to assure maintaining temperature uniformity in the polymer contacted by the inert gas.

A like stream of desiccated gas can be and preferably is employed over all bodies of the polymerization reaction mixture except in the initiation stage previously described. If desired, the exit gas from one zone can be supplied to another zone.

When the polymer leaving any polymerization zone subsequent to the first stripping zone has unduly high viscosity, the desired viscosity can be obtained by contacting the polymer in this zone with an atmosphere of controlled, relatively high, water vapor pressure whereby the viscosity increase in this zone can be made slow, or indeed a controlled decrease of viscosity can be obtained.

The degree of polymerization of the final polymer is preferably set by maintaining temperatures and residence times at suitable constant levels such that the desired degree of polymerization has not yet been reached when the polycaproamide enters the last polymerization zone, but the entering polymer has constant viscosity. A flow of desiccated inert gas is then maintained over the surface of a polymer pool moving in plug flow through the last polymerization zone at constant temperature and constant residence time whereby, we have found, the polymerization continues in this last zone to a viscosity level which can be controlled by varying the rate of flow of inert gas therein and thus brought with high uniformity to the desired level.

The examples which follow set forth completely specific embodiments of our invention and are illustrative of our invention but are not to be interpreted as limiting the invention to all details of the examples.

*Example 1*

(A) The apparatus was purged with inert gas, and e-caprolactam of 99.8% purity, the balance substantially all water, was continuously supplied at substantially its isoelectric point (pH 5.7) to a three-kettle continuous polymerization system from a storage vessel.

The apparatus was essentially as schematically illustrated in the attached flow chart. Each of the 3 cylindrical polymerization kettles used (designated 4, 23, and 25 in the flow chart) had a diameter of about 1 foot and height of about 1.5 feet. The kettles were provided with liquid level controllers which actuated the supply pump for each kettle to increase or decrease the flow of reaction mixture thereto as needed to maintain constant liquid level in each kettle. The pump discharging the final kettle removed the product at constant volumetric flow rate.

Each kettle was jacketed with circulating liquid (Dowtherm) and was smoothly stirred with an anchor stirrer passing the walls at close clearance whereby to drive the reaction mixture in laminar flow horizontally away from the kettle walls. Thereby temperature of the reaction mixture in each kettle was kept constant within about ±1° C. as measured and controlled by a thermocouple in a well dipping into the reaction mixture. The reaction mixture progressed through each kettle in essentially plug flow from the inlet above the liquid level in the kettle to the outlet at the bottom of the kettle. The piping and pumps between kettles were jacketed with heating fluid to prevent heat loss.

The first kettle, 4 in the flow chart, was provided with an inlet for high pressure steam and with gas phase pressure control means (12 in the flow chart).

The stripping vessel (designated 8 in the accompanying flow chart) was a 6 inch diameter vertical pipe, 3 feet long, jacketed with heating liquid (Dowtherm) to compensate for heat losses. The forming die (7 in the flow chart) at the top of this chamber was a ¼ inch diameter hole through a plate clamped between flanges in a 1 inch feed pipe just above the stripping vessel. The bottom of the stripping chamber tapered to fit a 2 inch discharge pipe sloping down to the kettle below. Polymer melt could flow out this discharge pipe countercurrently to gas flow entering the stripping vessel through this pipe from the kettle. An exit for gas was provided near the top of the stripping vessel, leading to a condenser (designated 22 in the accompanying flow chart).

In this example the stripping vessel was connected vertically above the second polymerization kettle as shown in the accompanying flow chart.

The third kettle (designated 25 in the accompanying flow chart) was essentially the same as the second polymerization kettle.

The molten polymerization reaction mixture passed in plug flow through the initiation zone (kettle 4 of the flow chart) under laminar agitation and with residence time in this kettle of about 155 minutes. The depth of the reaction mixture in this kettle was about 9 inches. A steam pressure of about 70 p.s.i. above atmospheric pressure was maintained in the gas space in this kettle. The temperature maintained in the reaction mixture in this kettle was about 254° C.

The effluent reaction mixture from this kettle was about 15–20% by weight lactam and about 1% by weight water. Upon leaching with hot water and drying, the polymer in this effluent shows Formic Acid Relative Viscosity of about 13.

This effluent was continuously transferred by pump 6 of the flow chart to the forming orifice at the top of the stripping vessel where the reaction mixture, containing water was formed into a vertical strand descending through the stripping vessel. The pressure on the reaction mixture entering the orifice was about 10 p.s.i. above atmospheric. Heat loss from the vessel was counteracted by maintaining the liquid in the jacket at about 255° C. Inert gas, supplied to provide a flow through the gas space in kettle 23 below the stripping vessel, flowed upward into and through the stripping vessel from the gas space of the kettle below (designated 23 in the flow chart). This gas as fed to kettle 23 was a mixture of nitrogen and carbon dioxide, freed of oxygen, and desiccated by passage through silica gel. A maximum for residence time of the reaction mixture in strandular form can be calculated from the orifice diameter of ¼ inch, the throughput of about 15 lbs. per hour, and the vessel length of 3 feet, to be about 15 seconds. In view of the attenuation observed in such falling strand, the actual time will be significantly less than 15 seconds, say about 5–10 seconds. The strand fell into a heated sloping 2 inch pipe, about 2½ feet long, leading into a pool of reaction mixture in the kettle below (23 in the accompanying flow chart). The reaction mixture flowed down this pipe as a shallow stream, countercurrently to inert gas entering the pipe from kettle 23. The residence time of the reaction mixture in stream form in this pipe was about 2 minutes; and this exposure further contributed to the water removal from this reaction mixture.

From the pipe the reaction mixture ran into the pool of polymerization reaction mixture in kettle 23, which pool was progressing downward through the kettle in plug flow and under laminar horizontal stirring. The depth of this pool was about 9 inches and corresponded to residence time in this kettle of about 145 minutes. The rate of flow of the desiccated inert gas supplied to the gas space in this kettle was 720 cc. per minute, its temperature as supplied being about 75° F. and its pressure about ¼–½ p.s.i. above atmospheric. The temperature maintained in the reaction mixture in this kettle was about 255° C. Contact with this reaction mixture preheated the inert gas flowing into the stripping vessel.

Water made up about 5% by weight of the condensate obtained in condenser 22 from the exit gas leaving kettle 23 and stripping vessel 8. The balance of the condensate was essentially lactam monomer. The condensate amounted to about 1½–2 pounds per hour.

The reaction mixture leaving kettle 23 contained about 13–14% by weight of materials extractable by hot water, consisting essentially of lactam monomer and low polymers such as cyclic dimer and trimer. A sample of the polymer in this effluent after leaching with hot water and drying showed Formic Acid Relative Viscosity of about 33–34.

The effluent from kettle 23 was supplied by a jacketed pump (indicated at 24 in the flow chart) through heated lines to maintain its temperature, to the inlet at the top of the third polymerization zone, kettle 25 in the flow chart. The operation in this kettle was essentially as for the preceding kettle; i.e. the reaction mixture progressed therethrough in plug flow, under laminar horizontal stirring, with residence time of about 145 minutes, at temperature maintained at about 257° C. and under now of desiccated inert gas of about 720 cc. per minute passed through the headspace over the reaction mixture. The effluent was withdrawn at constant volumetric flow rate by a jacketed pump indicated at 26 in the flow chart. The rate of withdrawal of this effluent amounted to about 15 lbs. per hour.

Continuous operation was maintained for 40 hours, then samples were taken for analyses over a 12 hour period. The effluent from the final kettle showed average content of materials extractable by hot water leaching of 12.24%. The polymer obtained, after the leaching with hot water and drying, showed average Formic Acid Relative Viscosity of 52.3.

A polymer produced by the same operations as in this example but omitting the stripping vessel will have, after leaching with hot water and drying, Relative Formic Acid Viscosity of only about 34 or 35. The average overall residence time in this example was about 7.4 hours; whereas in like operations but without the stripping vessel the residence time required to reach the same final Relative Formic Acid Viscosity reached in this example will be about 10 hours. Most of the acceleration of polymerization observed in operating this example, as compared to like operations without a stripping vessel, apparently occurred in the final (third) kettle of the system, on the basis that the Relative Formic Acid Viscosity of the polymer being supplied to the third kettle, as above noted, was about 33–34; and in like operations omitting the stripping vessel, the polymer going to the third kettle will have Relative Formic Acid Viscosity of about 30.

(B) When the operations of the above part (A) are modified by locating the stripping vessel over the third kettle, instead of over the second kettle of our polymerization system, considerably less water is condensed from the exit gas leaving the stripping vessel; but the overall polymerization time to Formic Acid Relative Viscosities in the range from 50 up is reduced by at least one hour due to acceleration after the second kettle.

(C) When the operations of part (A) above are modified by use of higher temperatures than the 254°–257° C. temperatures used in part (A), especially about 275° C. in the first polymerization kettle and about 265° C. or about 270° C. in each of the two succeeding kettles, at least about a 50% higher production rate can be realized. Production of high quality polymer at maximum rates requires a relatively high rate of flow of desiccated gas through the stripping vessel and over the two pools of reaction mixture subsequent thereto, desirably a gas flow of about 50–200 cc. of gas (STP) per gram of reaction product produced per hour.

(D) The operations of part (A) above can be modified by introducing further additives into the first polymerization kettle instead of using water as the sole additive. Representative of such additives which have been used alone or in combination without affecting the course of the above operations are aging stabilizers such as metallic compounds, e.g. copper compounds, aromatic amine/ketone condensation products such as those of Schule U.S. Patent 3,003,995, etc. Operations in which these additives were employed proceeded essentially as above set out in part (A) to give essentially the same Formic Acid Relative Viscosity in the final polymers.

Operations in accordance with the above example part (A) or any of the above modifications thereof, (B), (C), and (D) can be controlled by varying the flow rate of inert gas over the reaction mixture in the last kettle, and/or especially for part (C), by varying the residence time by making small changes in speed of the final pump (26 of the flow chart). Thereby a final polymer of Formic Acid Relative Viscosity constant within ±1 unit can be continuously produced.

*Example 2*

The continuous operations set forth in Example 1 parts (A), (C), and (D) above have been experimentally scaled up by enlarging all vessels, pipes, pumps, etc. while retaining essentially the same temperatures, water vapor pressures, gas flow rates, and reaction mixture residence times in the 3 polymerization vessels. In these scaled up operations, a multi-hole die with 400 holes each of $3/16$ inch diameter was substituted for the single hole die, in a scaled up version of the stripping vessel of Example 1.

The 400 strands thereby formed descended countercurrently to the stream of inert gas rising through the central opening at the bottom of the stripping vessel. As they fell, the outer strands, i.e. about half of all the strands on a weight basis, dropped to the inwardly sloping lower end of the stripping vessel, and flowed down as streams into the polymerization vessel below. By this contact with the heated lower walls of the stripping vessel, the reaction mixture regained heat consumed for evaporation of volatiles, and thus entered the polymerization zone at approximately the temperature of the pool of reaction mixture therein, whereby uniformity of conditions therein was improved.

The stripping vessel of this example was about 6 feet long instead of 3 feet, and this combined with the hold-up of reaction mixture on the lower walls of the stripping vessel, produced average residence time of reaction mixture in high surface area form in these operations estimated to be of the order of 1 minute.

The final polymers of this example showed Formic Acid Relative Viscosities which remained constant within 1 unit at the desired levels, e.g. 57, over the entire periods of continuous operation tested and had good spinning characteristics after the usual pelleting, hot water leaching, and drying operations.

While our process has been described with reference to production of ε-caprolactam homopolymers, it is similarly applicable to production of copolymers of caprolactam containing at least about 25% of ε-caprolactam; and production of such copolymers is to be understood as included within the scope of our invention.

We claim:

1. In a process for continuous polymerization of ε-caprolactam initiated by water under superatmospheric pressures, the improvement which comprises heating and thereby polymerizing epsilon-caprolactam under a water vapor pressure of about 2–10 atmospheres at temperature between about 240° C. and about 280° C. for a time of about 1–5 hours thereby forming a poly-caproamide polymerization reaction mixture, containing water; giving said polymerization reaction mixture a form having high exposed surface area of at least about 1 square inch per cubic inch of volume in contact with an atmosphere capable of evaporating water from said reaction mixture, and maintaining the reaction mixture in such high surface area form for a time of at least about 5 seconds thereby removing water therefrom; thereafter in a polymerization zone traversed subsequently to the zone containing the high surface area form of the reaction mixture, supplying the polycaproamide to a pool having exposed surface area not above about 1 square inch per 3 cubic inches of volume which pool is maintained in plug flow and with an atmosphere, over said pool, in which control is maintained on the water vapor partial pressures and with residence time in all such pools totalling at least about 1 hour; whereby subsequently to the stage of removing water while giving the reaction mixture a high surface area form, the Formic Acid Relative Viscosity of the polymer in the reaction mixture increases by at least 10%.

2. Process of claim 1 wherein polycaproamide polymerization reaction mixture containing about 0.2% to about 2% by weight of water is formed into a high surface area body having an area exposed to the atmosphere between about 10 square inches and about 1,000 square inches per cubic inch of volume of the body; and wherein said polycaproamide polymerization reaction mixture containing water is maintained at pressures at least about 10 p.s.i. higher than the pressure on the high surface area body.

3. Process of claim 2 wherein the polymerization reaction temperature is maintained in the range between about 240° C. and about 280° C. and is maintained constant in each pool constituting a polymerization zone within about ±2° C.; the water vapor partial pressure of the atmosphere in each said pool is maintained constant within about 1 pound per square inch; the reaction mixture in each said pool progresses in plug flow and is stirred in laminar flow perpendicular to the line of plug flow; and over the pool of polycaproamide polymerization reaction mixture in the final polymerization zone, inert gas is flowed at controlled rates; the residence time of polymerization reaction mixture in this final zone being at least about 1 hour and the Formic Acid Relative Viscosity of the polymer product leaving this zone being at least 10% greater than that of the polymer entering this zone.

4. Process of claim 3 wherein the high surface area body is given the form of strands, and at least about half of these strands, on a weight basis, are thereafter formed into streams flowing on a heated surface; and the reaction mixture is maintained in the strand form and the flowing stream form for combined average residence time between about 15 seconds and about 5 minutes.

5. Process of claim 3 wherein the flow rate of the inert gas in the final polymerization zone is regulated in response to the viscosity of the polymer product being obtained, to maintain constant viscosity thereof, and in the sense that higher flow rate produces polymer of higher viscosity.

6. Process of claim 3 wherein the polymerization reaction mixture in the first polymerization zone is maintained under water vapor pressure in the range between about 2 and about 10 atmospheres absolute and at constant temperature of about 275° C.; the polymerization reaction mixture in each subsequent polymerization zone is maintained at constant temperature in the range from about 265° C. to about 270° C.; and inert gas is flowed in contact with the polymerization reaction mixture in each polymerization zone subsequent to the first and in contact with the polycaproamide polymerization reaction mixture when in the form of a high surface area body, at controlled rate between about 50 and about 200 cc. of gas (STP) per gram of reaction product produced per hour, said inert gas as supplied to the polymerization system having controlled water vapor partial pressure in the range from that of desiccated gas up to about 10 mm. of mercury absolute pressure.

References Cited by the Examiner
UNITED STATES PATENTS

| | | | |
|---|---|---|---|
| 2,987,506 | 6/1961 | Lum | 260—78 |
| 3,027,355 | 3/1962 | Taul et al. | 260—78 |
| 3,044,993 | 7/1962 | Tiemersma | 260—78 |
| 3,090,773 | 5/1963 | Papero et al. | 260—78 |
| 3,171,829 | 3/1965 | Wiesner et al. | 260—78 |

WILLIAM H. SHORT, *Primary Examiner.*

LOUISE P. QUAST, *Examiner.*

H. D. ANDERSON, *Assistant Examiner.*